(12) United States Patent
Patey

(10) Patent No.: US 12,479,598 B2
(45) Date of Patent: Nov. 25, 2025

(54) REMOTE POWER SWITCH FOR AN AIRCRAFT TUG

(71) Applicant: Best Tugs, LLC, Spanish Fork, UT (US)

(72) Inventor: Mark R. Patey, Spanish Fork, UT (US)

(73) Assignee: Best Tugs, LLC, Spanish Fork, UT (US)

( * ) Notice: Subject to any disclaimer, the term of this patent is extended or adjusted under 35 U.S.C. 154(b) by 97 days.

(21) Appl. No.: 18/226,747

(22) Filed: Jul. 26, 2023

(65) Prior Publication Data

US 2024/0034484 A1 Feb. 1, 2024

Related U.S. Application Data

(60) Provisional application No. 63/392,305, filed on Jul. 26, 2022.

(51) Int. Cl.
*B64F 1/228* (2024.01)
*G05D 1/223* (2024.01)
*G05D 107/80* (2024.01)

(52) U.S. Cl.
CPC ............ *B64F 1/228* (2013.01); *G05D 1/223* (2024.01); *G05D 2107/85* (2024.01)

(58) Field of Classification Search
CPC .......... B64F 1/228; B64F 1/227; B64F 1/226; G05D 1/223; G05D 2107/85
See application file for complete search history.

(56) References Cited

U.S. PATENT DOCUMENTS

| | | | |
|---|---|---|---|
| 6,294,985 B1* | 9/2001 | Simon ..................... | B64F 1/002 116/28 R |
| 2008/0186151 A1* | 8/2008 | Tsai ........................ | H01H 9/167 340/12.3 |
| 2011/0073388 A1* | 3/2011 | Andres ................... | B64F 1/224 244/50 |
| 2012/0215393 A1* | 8/2012 | Schiedegger ............. | B60P 3/11 701/23 |
| 2017/0057663 A1* | 3/2017 | Alonso Tabares ... | G05D 1/0016 |
| 2017/0283089 A1* | 10/2017 | Patey ....................... | B60P 3/11 |
| 2020/0341461 A1* | 10/2020 | Yokoyama ......... | B60W 60/0015 |
| 2023/0083514 A1* | 3/2023 | Nishibeppu .......... | G05D 1/0088 701/50 |

FOREIGN PATENT DOCUMENTS

| | | | | |
|---|---|---|---|---|
| DE | 102018205963 A1 * | 10/2019 | ............ | B60W 50/00 |
| JP | 6786407 B2 * | 11/2020 | ............ | G05D 1/0011 |

OTHER PUBLICATIONS

Fetterolf, C.S.; Using Augmented Reality To Enhance Situational Awareness for Aircraft Towing; Monterey, CA; Naval Postgraduate School; Jun. 2020; Downloaded from NPS Archive: Calhoun; pp. 18-22 (Year: 2020).*

* cited by examiner

*Primary Examiner* — Michael J Zanelli
(74) *Attorney, Agent, or Firm* — DENTONS Durham Jones Pinegar

(57) ABSTRACT

This disclosure relates generally to aircraft tugs, which assist in the movement of small aircraft. More specifically, this disclosure relates to a remote power switch, which may also be referred to as an emergency tug shutoff (ETSO) switch, for remotely stopping movement of an aircraft tug. Systems that include such an aircraft tug and at least one remote power switch are also disclosed, as are methods for remotely stopping an aircraft tug.

13 Claims, 2 Drawing Sheets

REMOTE POWER SWITCH FOR AN AIRCRAFT TUG

CROSS-REFERENCE TO RELATED APPLICATION

A claim for priority to the Jul. 26, 2022 filing date of U.S. Provisional Patent Application No. 63/392,305, titled REMOTE POWER SWITCH FOR AN AIRCRAFT TUG ("the '305 Provisional Application"), is hereby made pursuant to 35 U.S.C. § 119(e). The entire disclosure of the '305 Provisional Application is hereby incorporated herein.

TECHNICAL FIELD

This disclosure relates generally to aircraft tugs, which assist in the movement of small aircraft. More specifically, this disclosure relates to a remote power switch, which may also be referred to as an emergency tug shutoff (ETSO) switch, for remotely stopping movement of an aircraft tug. Systems that include such an aircraft tug and at least one remote power switch are also disclosed, as are methods for remotely stopping an aircraft tug.

RELATED ART

As a smaller aircraft is moved from one location to another on the ground (e.g., in an aircraft hangar, on the tarmac of an airport, etc.), an aircraft tug may be used to assist in movement of the aircraft. While one individual (an airport line technician, or "line guy") operates the aircraft tug and controls movement of the aircraft, one or more other individuals (also airport line technicians) typically watch the tips and other portions of the wings of the aircraft to ensure that the wings and other parts of the aircraft do not collide with other objects (e.g., buildings, other fixed objects, vehicles, other aircraft, the ground, etc.). The individuals who watch the wings of the aircraft are commonly referred to as "wing walkers."

When a wing walker or other individual notices movement of the aircraft in a direction that will likely cause one of its wings to collide with another object, the wing walker typically communicates his or her concern to the individual(s) operating the aircraft tug. Such communication may be vocal, by way of hand signals, or the like. On occasion, such communication is ineffective because the individual operating the aircraft tug does not see, hear (e.g., due to noise, etc.), or understand the wing walker. When communication between the wing walker and the individual operating the aircraft tug breaks down, ground accidents are much more likely to occur. Slow reaction times (understanding what is being communicated, the amount of time to physically respond to what is being communicated, etc.) may also result in accidents.

Ground accidents involving aircraft injure about 243,000 people every year. In addition, ground accidents can be costly for the aircraft involved in them. It can take months or even years to repair damage incurred by an aircraft during a ground accident. The estimated cost of a single ramp accident (e.g., "hangar rash") is about $250,000. The cost of repairing aircraft that are involved in ground accidents is estimated to be up to $10,000,000,000 ($10 billion) annually.

SUMMARY

In one aspect, a remote power control system for an aircraft tug is disclosed. Such a remote power control system may be used by a wing walker or another individual (e.g., a fixed based operator (FBO), etc.) when the individual notices that a current course of movement of an aircraft by an aircraft tug is likely to cause a wing of the aircraft to collide with another object but the individual does not believe they will be able to communicate the threat of collision to an individual operating the aircraft tug adequately (clearly, loudly, etc.) or quickly enough to avoid the expected collision. The remote power control system may include an aircraft tug component (or an "aircraft tug"), which may be part of the aircraft tug (e.g., an aircraft tug available from Best Tugs, LLC, of Spanish Fork, Utah, such as the low-profile, manually operable aircraft tug disclosed by U.S. Patent Application Publication No. US 2017/0283089 A1, etc.), and one or more remote control components (or "remote controls") for use with the aircraft tug component, with each remote control component operable by a wing walker or another individual in proximity to (e.g., watching, etc.) the aircraft as the aircraft tug moves the aircraft.

The aircraft tug component of the remote power control system may include a receiver and a relay. The relay may control the flow of power from a power supply of the aircraft tug to its motor and/or the operation of an emergency brake of the aircraft tug. When closed, the relay may allow power to flow from the power supply to the motor and/or disengage the emergency brake unless an operator of the aircraft tug intentionally engages the emergency brake. When open, the relay prevents power from flowing from the power supply to the motor and/or engages the emergency brake. The receiver (e.g., a radio receiver, etc.) is in communication with the relay and may receive radio signals that determine whether the relay is open or closed in a manner known in the art. More specifically, the receiver may detect a termination signal and to communicate the absence or presence of the termination signal to the relay.

In the absence of a termination signal (i.e., when the receiver does not detect the termination signal), the relay is closed (e.g., closes, remains closed, etc.). The relay may automatically close or remain closed in the absence of a termination signal. With the relay closed, the motor of the aircraft tug may operate and/or the emergency brake of the aircraft tug may be disengaged and the aircraft tug may move.

In the presence of a termination signal (i.e., when the receiver detects the termination signal), the relay is open (e.g., opens, remains open, etc.). The relay may automatically open and remain open in the presence of a termination signal. With the relay open, the motor of the aircraft tug may stop and/or the emergency brake of the aircraft tug may engage, stopping the aircraft tug.

The remote control component, which may also be referred to herein as a "remote power switch," includes a power supply, a switch, and a transmitter. The power supply may comprise a battery (e.g., a rechargeable battery, etc.) or any other suitable source of power. The switch controls the flow of power from the power supply to the transmitter. When the switch is on and, thus, power flows to the transmitter, the transmitter generates and transmits the termination signal. When the switch is off and, thus, no power flows to the transmitter, no termination signal is generated or transmitted by the transmitter (i.e., a termination signal is absent).

In addition to the power supply, the switch, and the transmitter, the remote control component may include a housing that carries the power supply, the switch, and the transmitter. The housing may be formed from a durable, lightweight material (e.g., aluminum, titanium, etc.). The housing may be elongated. The housing may have a configuration that enables it to be held within and operated by a single hand of an individual. In some embodiments, the housing may be cylindrical or substantially cylindrical in shape.

The remote control component may also include a button. The button may control operation of the switch. In embodiments where the remote control component includes a housing, the button may be on the housing. In embodiments where the remote control component includes an elongated housing, the button may be on an end of the housing. The button may have an extended position that turns the switch off (i.e., no termination signal generated or transmitted by the transmitter) and a depressed position that turns the switch on (i.e., the transmitter may generate and transmit the termination signal). In some embodiments, the button may be pushed from the extended position to the depressed position to turn the switch on and, thus, to enable the transmitter to transmit the termination signal and stop movement of the aircraft tug component (e.g., disrupt the flow of power from the power supply to the motor of the aircraft tug component, engage an emergency brake of the aircraft tug component, etc.). The button may also be pulled from the depressed position to the extended position to turn the switch off and, thus, to turn off power to the transmitter and to terminate the termination signal and to enable movement of the aircraft tug component to resume (e.g., enable the flow of power from the power supply to the motor of the aircraft tug component, disengage an emergency brake of the aircraft tug component, etc.).

The termination signal generated by the transmitter of the remote control component of the remote power control system may be unique or substantially unique to the receiver of a particular aircraft tug component and, thus, to a particular aircraft tug. In some embodiments, the termination signal may be encrypted by the transmitter or a processor associated therewith and decrypted by the receiver or a processor associated therewith.

A remote power control system may be incorporated into an aircraft tug as it is manufactured or an existing aircraft tug can be retrofit with a remote power control system.

In another aspect, an aircraft tug may be remotely stopped (e.g., by shutting of power to a motor of the aircraft tug, by applying an emergency brake of the aircraft tug, etc., or by a combination of actions) while the aircraft tug is used to move an aircraft. More specifically, the aircraft tug may be remotely stopped in an emergency, such as when a wing walker believes that a wing or other part of the aircraft is about to collide with another object.

In a specific embodiment, a method for moving an aircraft on the ground may include coupling an aircraft tug to an aircraft and operating the aircraft tug from a first location (e.g., by a first individual positioned at a first location, such as the location of the aircraft tug, etc.). As the aircraft tug operates, movement of wingtips and/or one or more other portions of the aircraft may be watched from a second location remote from the first location (e.g., by a second individual, such as a wing walker, etc.). If an individual watching movement of the aircraft (i.e., the second individual) determines that movement of the aircraft needs to stop, that individual may remotely stop the aircraft tug from the second location.

Movement of the aircraft tug and, thus, of the aircraft may be remotely stopped from the second location with a remote power switch, such as with the embodiments of remote power switches disclosed above. Use of the remote power switch may terminate power from the power supply of the aircraft tug to the motor of the aircraft tug and/or apply an emergency brake of the aircraft tug. For example, a button on the remote power switch may be pressed, or depressed, to cause a transmitter of the remote power switch to transmit, or send, a termination signal. As the termination signal is received by a receiver of the aircraft tug, a relay of the aircraft tug opens, terminating the flow of power from the power supply of the aircraft tug to the motor of the aircraft tug. Receipt of the termination signal and/or opening of the relay may also cause an emergency brake of the aircraft tug to function.

The remote power switch may also be used to resume movement of the aircraft tug. For example, the button of the remote power switch may be rotated, pulled, and/or extended, to turn off the flow of power from the power supply to the transmitter of the remote power switch and, thus, to stop generation and transmission of the termination signal. When the receiver of the aircraft tug no longer receives the termination signal, the relay of the tug closes, enabling power to flow from the power supply of the aircraft tug to the motor of the aircraft tug and optionally releasing an emergency brake of the aircraft tug (at least until an operator of the aircraft tug intentionally applies the emergency brake). Thus, movement of the aircraft tug may resume.

By watching movement of the wingtips and/or one or more other portions of the aircraft and having the ability to remotely stop the aircraft tug, an individual (i.e., the second individual) may ensure that the wingtips and other parts of the aircraft do not collide with another object.

Other aspects of the disclosed subject matter, as well as features and advantages of various aspects of the disclosed subject matter, should be apparent to those of ordinary skill in the art from consideration of the preceding disclosure, the accompanying images, and the appended claims.

DETAILED DESCRIPTION

Figure 1:
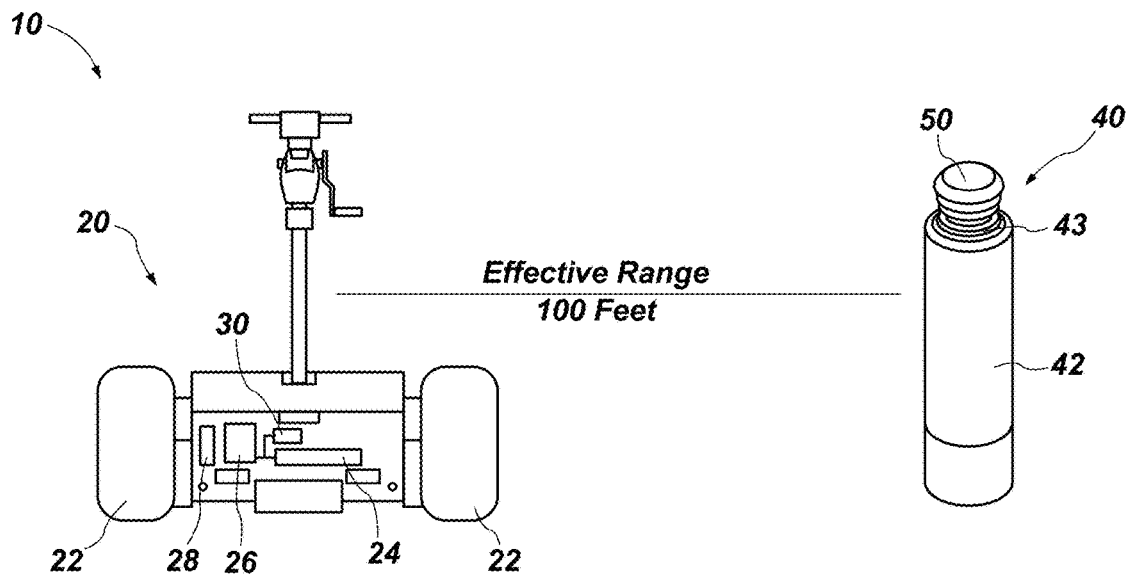
FIG. 1 depicts an embodiment of a remote power control system for an aircraft tug, with the remote power control system including an aircraft tug component and a remote control component.
Figure 2:
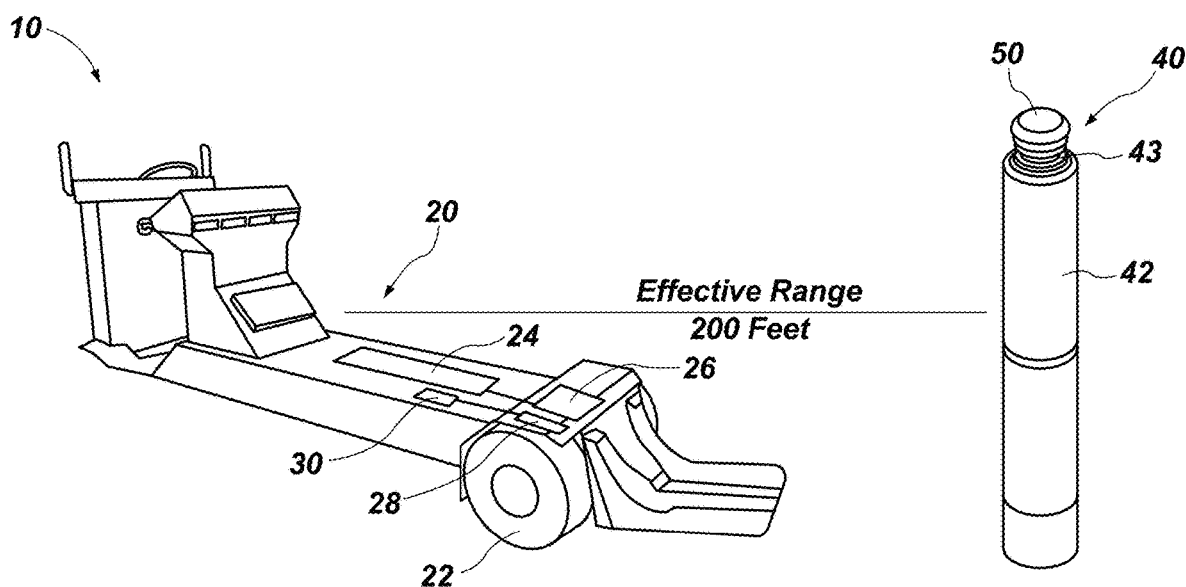
FIG. 2 depicts another embodiment of a remote power control system for an aircraft tug, with the remote power control system including an aircraft tug component and a remote control component.

With reference to FIGS. 1 and 2, embodiments of remote power control systems 10 are depicted. The remote power control system 10 includes an aircraft tug component 20 and a remote control component 40.

The aircraft tug component 20 of a remote power control system 10 may comprise many of the same components as a conventional aircraft tug, which may include, among other things, wheels 22, a power supply 24, a motor 26, and an emergency brake 28. In addition the aircraft tug component 20 may comprise an emergency tug shutoff (ETSO) system 30. The ETSO system 30 may enable selective termination of operation of the aircraft tug component 20. Without limitation, the ETSO system 30 may enable the selective termination of power from the power supply 24 to the motor 26, the selective engagement of the emergency brake 28, the selective disengagement of the motor 26 from the wheels 22, or the like, or any combination of the foregoing.

Figure 3:
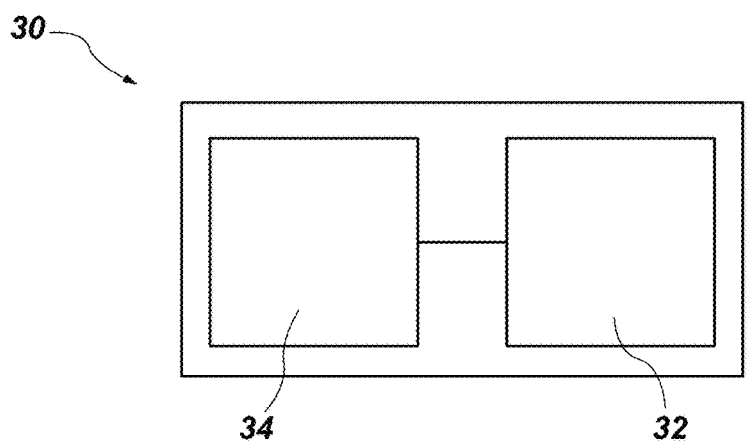
FIG. 3 provides a schematic representation of an embodiment of an emergency tug shutoff (ETSO) system for an aircraft tug component, which ETSO system includes a receiver and a relay that controls operation of the aircraft tug component.

As depicted by FIG. 3, the ETSO system 30 of the aircraft tug component 20 may include a receiver 32 and a relay 34. The receiver 32 may comprise a radio receiver that can receive instructive signals (e.g., a termination signal, etc.) (e.g., by way of a suitable antenna (not shown)) of any suitable wavelength or range of wavelengths. The relay 34 may operate under control of the receiver 32. More specifically, the relay 34 may have a first state (e.g., a closed state, etc.) and a second state (e.g., an open state, etc.). The relay 34 may enter into the first state or remain in the first state while the receiver 32 does not detect or receive an instructive signal and enter into the second state or remain in the second state when the receiver 32 detects and receives an instructive signal.

The relay 34 may be positioned and, optionally, arranged with other components of the aircraft tug component 20 to control the operation of the aircraft tug component 20. For example, the relay may control the flow of power (i.e., electricity) from the power supply 24 to the motor 26, operation of the emergency brake 28, the transfer of power (i.e., force) from the motor 26 to the wheels 22, or any other system that may selectively and immediately terminate operation of the aircraft tug component. More specifically, with the relay 34 in the first state (e.g., the closed state), the aircraft tug component 20 may operate. For example, power may flow from the power supply 24 to the motor 26, the emergency brake 28 may be disengaged, power may be transferred from the motor 26 to the wheels 22, etc. Placement of the relay 34 in the second state (e.g., the open state) may prevent the aircraft tug component 20 from operating. For example, power from the power supply 24 to the motor 26 may be terminated, the emergency brake 28 may be engaged, power may not be transferred from the motor 26 to the wheels 22, etc.

The ETSO system 30 may be built into the aircraft tug component 20 or retrofit onto (e.g., plugged into, etc.) the aircraft tug component.

Figure 4A:
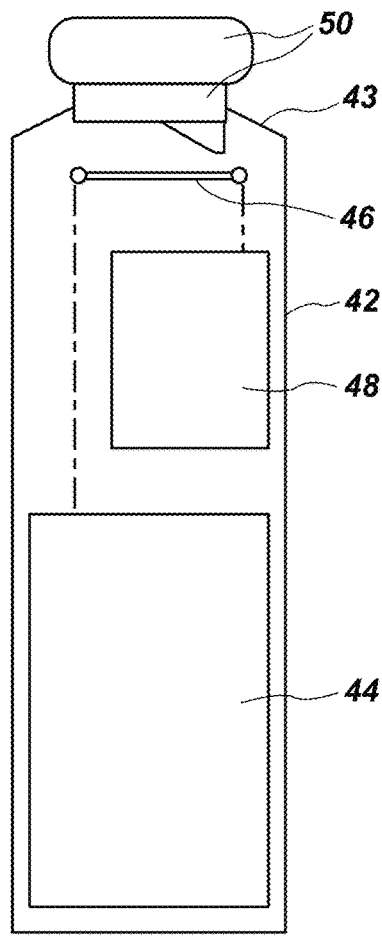
FIGS. 4A and 4B provide schematic representations of an embodiment of a remote control component that includes a button, a switch, and a transmitter that selectively generates an instructive signal (e.g., a termination signal, etc.) for operation of the aircraft tug component, with FIG. 4A showing the remote control component in a first state, where no instructive signal is generated, and FIG. 4B showing the remote control component in a second state, where an instructive signal is generated.
Figure 4B:
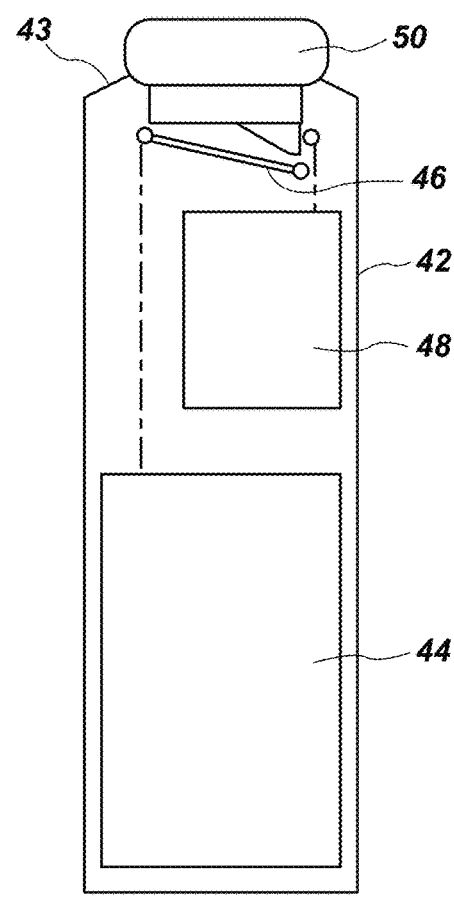

Turning now to FIGS. 4A and 4B, the remote control component 40 of the remote power control system 10 includes a housing 42, a power supply 44, a switch 46, and a transmitter 48. The remote control component 40 also includes a button 50.

The housing 42 carries the power supply 44, the switch 46, and the transmitter 48. The housing 42 may be formed from a durable, lightweight material (e.g., aluminum, titanium, etc.). The housing 42 may be elongated. The housing may have a configuration that enables it to be held within and operated by a single hand of an individual. In some embodiments, the housing 42 may be cylindrical or substantially cylindrical in shape.

The power supply 44 may comprise one or more batteries (e.g., a rechargeable battery, etc.) or any other suitable source of power.

The switch 46 controls the flow of power from the power supply 44 to the transmitter 48. When the switch 46 is on and, thus, power flows from the power supply 44 to the transmitter 48, the transmitter 48 generates and transmits the instructive signal (e.g., the termination signal, etc.). When the switch 46 is off and, thus, no power flows from the power supply 44 to the transmitter 48, no instructive signal is generated or transmitted by the transmitter 48 (i.e., a termination signal is absent).

The transmitter 48 may comprise a radio transmitter that can generate and transmit (e.g., by way of a suitable antenna (not shown)) instructive signals (e.g., a termination signal, etc.) of any suitable wavelength or range of wavelengths. The transmitter 48 generates and transmits instructive signals at wavelengths that may be detected and received by the receiver 32 of the ETSO system 30.

The button 50 may control operation of the switch 46. The button 50 may be carried by the housing 42 in a manner that enables the button 50 to be manipulated (e.g., pushed, turned, etc.). In embodiments where the housing 42 is elongated (see, e.g., FIGS. 1 and 2), the button 50 may be positioned at an end 43 of the housing 42. FIG. 4A shows the button 50 in an extended position that places the switch 46 and the remote control component 40 in a first state (e.g., the switch 46 is off, where no instructive signal is generated or transmitted by the transmitter 48, etc.). FIG. 4B shows the button 50 in a depressed position that places the switch in a second state (e.g., turns the switch 46, where the transmitter 48 may generate and transmit the instructive signal, etc.).

In operating the remote control component 40, the button 50 may be pushed, or depressed (e.g., with a thumb, etc.) from the extended position shown in FIG. 4A to the depressed position shown in FIG. 4B to move the switch 46 from the first state to the second state (e.g., to turn the switch 46 on, etc.). In the second state, the transmitter 48 may generate and transmit an instructive signal, which may stop movement of the aircraft tug component 20 (FIGS. 1 and 2).

Operation of the remote control component 40 may also include replacing the button 50 in the extended position shown in FIG. 4A, or moving the button 50 from the depressed position shown in FIG. 4B to the extended position shown in FIG. 4A. The button 50 may be replaced in the extended position by turning or pulling the button 50. Placement of the button 50 in the extended position may move the switch 46 from the second state to the first state (e.g., turn the switch 46 off, etc.). Movement of the switch 46 to the first state may terminate the instructive signal, which may in turn enable operation of the aircraft tug component 20 (FIGS. 1 and 2) to resume.

The instructive termination signal generated by the transmitter 48 of the remote control component 40 of the remote power control system 10 may be unique or substantially unique to the receiver 32 of the ETSO system 30 of a particular aircraft tug component 20 and, thus, to a particular aircraft tug component 20. In some embodiments, the instructive signal may be encrypted by the transmitter 48 or a processor associated therewith and decrypted by the receiver 32 or a processor associated therewith.

A range of the remote control component 40 (e.g., 100 feet from the aircraft tug component 20, as shown in FIG. 1; 200 feet from the aircraft tug component 20, as shown in FIG. 2; etc.) may be dictated by the types of transmitter 48 and receiver 32 employed, the amount of power supplied to the transmitter, or in any other suitable manner.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A remote power switch for an aircraft tug, comprising:
   a housing;
   a power supply carried by the housing;
   a transmitter carried by the housing, operable under power provided by the power supply, and, when in communication with the power supply, transmits a signal that remotely terminates power to the aircraft tug;
   a switch carried by the housing to control the flow of power between the power supply and the transmitter; and
   a button on the housing to control the switch and having:
      an extended position in which the switch is off; and
      a depressed position in which the switch is on,
      the button pushable from the extended position to the depressed position,
      the button pullable from the depressed position to the extended position.

2. The remote power switch of claim 1, wherein the signal from the transmitter is unique to a particular aircraft tug.

3. The remote power switch of claim 1, wherein the housing comprises an elongated housing with a configuration that enables it to be held within and operated by a single hand of an individual.

4. The remote power switch of claim 3, wherein the button is located at an end of the elongated housing.

5. The remote power switch of claim 1, wherein the power supply comprises at a battery.

6. A remote power control system for an aircraft tug, comprising:
   an aircraft tug component, including:
      a receiver for a termination signal; and
      a relay in communication with the receiver and operable to selectively terminate power from a tug power supply to a motor of the aircraft tug upon receipt of the termination signal by the receiver and to allow power to flow from the tug power supply to the motor of the aircraft tug in an absence of the termination signal; and
   a remote control component, including:
      a power supply;
      a switch;
      a transmitter that receives power from the power supply and transmits the termination signal only when the switch is on;
      a housing carrying the power supply, the switch, and the transmitter; and
      a button that controls operation of the switch on the housing, the button having:
         an extended position in which the switch is off; and
         a depressed position in which the switch is on,
         the button pushable from the extended position to the depressed position,
         the button pullable from the depressed position to the extended position.

7. The remote power control system of claim 6, wherein the aircraft tug comprises a low-profile, manually operable aircraft tug.

8. The remote power control system of claim 6, wherein:
   the housing comprises an elongated housing with a configuration that enables it to be held within and operated by a single hand of an individual; and
   the button is located at an end of the elongated housing.

9. The remote power control system of claim 8, wherein the termination signal is unique to the transmitter of the remote control component and the receiver of the aircraft tug component.

10. The remote power control system of claim 6, wherein the relay of the aircraft tug component automatically closes in the absence of the termination signal.

11. A method for moving an aircraft on the ground, comprising:
    coupling an aircraft tug that includes a power supply and a motor to the aircraft;
    moving the aircraft by a first individual operating the aircraft tug at a first location;
    watching movement of wingtips of the aircraft by a second individual with a remote power switch at a second location, remote from the first location;
    if the second individual determines that movement of the aircraft needs to stop:
       remotely terminating power from the power supply to the motor of the aircraft tug from the second location with the remote power switch by depressing a button on the remote power switch, sending a termination signal from a transmitter of the remote power switch to a receiver of the aircraft tug, and opening a relay of the aircraft tug to terminate power from the power supply to the motor of the aircraft tug; and
       remotely restoring power from the power supply to the motor of the aircraft tug with the remote power switch by extending the button on the remote power switch, stopping the termination signal, and closing the relay in an absence of the termination signal to enable power to flow from the power supply to the motor of the aircraft tug.

12. The method of claim 11, wherein watching movement of wingtips of the aircraft comprises ensuring that the wingtips of the aircraft do not collide with another object.

13. The method of claim 11, wherein closing the relay comprises automatically closing the relay in the absence of the termination signal.

* * * * *